US008572155B2

(12) United States Patent
Yanovich et al.

(10) Patent No.: US 8,572,155 B2
(45) Date of Patent: Oct. 29, 2013

(54) VIRTUAL SENSORS

(75) Inventors: Aleksey Yanovich, Santa Clara, CA (US); Thorsten Kril, Santa Clara, CA (US); Natalia Kroupnova, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 859 days.

(21) Appl. No.: 12/069,879

(22) Filed: Feb. 12, 2008

(65) Prior Publication Data

US 2009/0055126 A1 Feb. 26, 2009

Related U.S. Application Data

(60) Provisional application No. 60/966,021, filed on Aug. 23, 2007.

(51) Int. Cl.
*G06F 15/16* (2006.01)

(52) U.S. Cl.
USPC .......................... 709/201; 709/217; 709/224

(58) Field of Classification Search
USPC .......................................... 709/201, 217, 224
See application file for complete search history.

(56) References Cited

U.S. PATENT DOCUMENTS

| 5,864,773 | A | 1/1999 | Barna et al. | |
|---|---|---|---|---|
| 6,223,214 | B1 | 4/2001 | Tufty et al. | |
| 6,772,034 | B1* | 8/2004 | Shi et al. | 700/121 |
| 6,839,713 | B1* | 1/2005 | Shi et al. | 1/1 |
| 6,904,391 | B2 | 6/2005 | Merkin et al. | |
| 6,970,758 | B1* | 11/2005 | Shi et al. | 700/108 |
| 7,020,701 | B1* | 3/2006 | Gelvin et al. | 709/224 |
| 7,752,360 | B2 | 7/2010 | Galles | |
| 2003/0144746 | A1* | 7/2003 | Hsiung et al. | 700/28 |
| 2006/0026267 | A1 | 2/2006 | Godin et al. | |
| 2006/0184264 | A1* | 8/2006 | Willis et al. | 700/108 |
| 2006/0259259 | A1* | 11/2006 | Rozenboim et al. | 702/83 |
| 2007/0150235 | A1* | 6/2007 | Lev-Ami et al. | 702/182 |
| 2008/0103617 | A1* | 5/2008 | Subramanian et al. | 700/96 |
| 2008/0312756 | A1 | 12/2008 | Grichnik et al. | |
| 2009/0086023 | A1 | 4/2009 | McCubbrey | |
| 2011/0010318 | A1 | 1/2011 | Roverso | |

FOREIGN PATENT DOCUMENTS

JP 2005-135075 A 5/2005

* cited by examiner

*Primary Examiner* — Nicholas Taylor

(74) *Attorney, Agent, or Firm* — Blakely, Sokoloff, Taylor & Zafman LLP

(57) ABSTRACT

A method and apparatus for providing a virtual sensor in real-time have been described. In one embodiment, a method to provide a virtual sensor in real-time includes identifying data indicating desired functionality. The method further includes executing the virtual sensor in real-time based on the identified data to generate an output of the virtual sensor with the output being used by at least one data analysis module in real-time for statistical process monitoring.

22 Claims, 8 Drawing Sheets

VIRTUAL SENSORS

RELATED APPLICATIONS

This application claims the priority benefit of U.S. Provisional Patent Application No. 60/966,021, filed on Aug. 23, 2007 and entitled, "VIRTUAL SENSORS," which is incorporated herein by reference.

TECHNICAL FIELD

Embodiments of the present invention relate to virtual sensors for manufacturing and process control.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2008, Applied Materials Inc., All Rights Reserved.

BACKGROUND

Many industries employ sophisticated manufacturing equipment that includes multiple sensors and controls, each of which may be carefully monitored during processing to ensure product quality. One method of monitoring the multiple sensors and controls is statistical process monitoring (a means of performing statistical analysis on sensor measurements and process control values (process variables)), which enables automatic detection and/or diagnosis of faults. A "fault" can be a malfunction or maladjustment of manufacturing equipment (e.g., deviation of a machine's operating parameters from intended values), or an indication of a need for preventive maintenance to prevent an imminent malfunction or maladjustment. Faults can produce defects in the devices being manufactured. Accordingly, one goal of statistical process monitoring is to detect and/or diagnose faults before they produce such defects.

One industry approach for statistical process monitoring includes collecting data, acquiring and storing data, analyzing data, and acting. Data is collected by various sensors located on the manufacturing equipment. However, these sensors may not be exposed or accessible. Data is then acquired from the manufacturing equipment and saved or stored in a database that can be located on a server. The data is acquired from various types of manufacturing equipment having different configurations and protocols which slows and complicates the acquisition of the data into the database.

Next, the data is analyzed which requires filtering (e.g., specific runs of semiconductor wafer) and possibly transformations of units. Also, the data must be pre-processed using complex algorithms (e.g., virtual sensors) in order to perform a meaningful analysis. Finally, action must be taken based on the data analysis. For example, faults or errors may indicate a malfunctioning equipment or a need to modify a process parameter immediately on the fly during real-time. The action usually occurs too late because the data analysis requires a significant amount of time. Furthermore, updating or creating new virtual sensors requires restarting or reinstalling the software application being run on a manufacturing machine.

BRIEF DESCRIPTION OF THE DRAWINGS

The present invention is illustrated by way of example, and not by way of limitation, in the figures of the accompanying drawings and in which.

DETAILED DESCRIPTION

Figure 1:
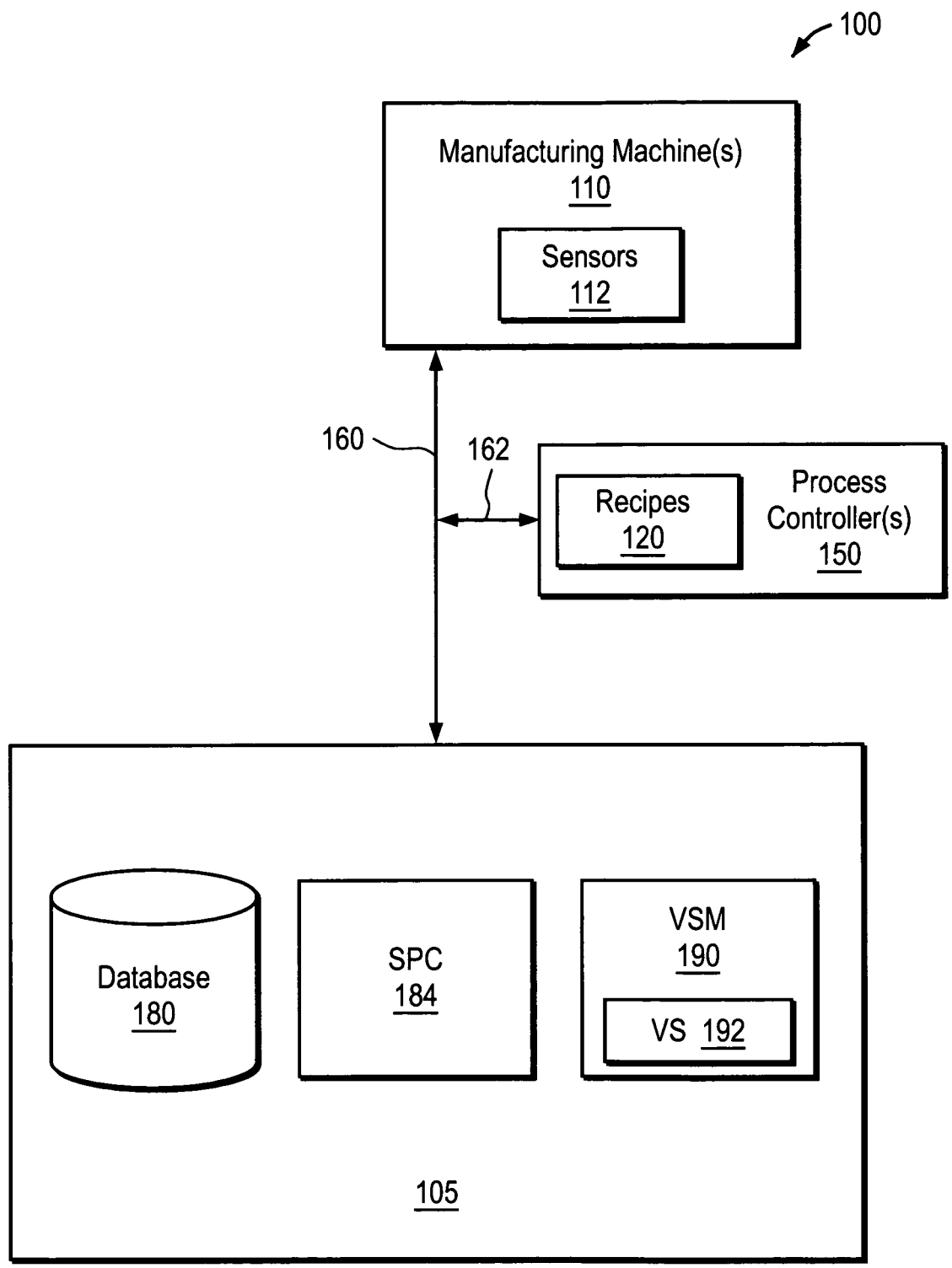
FIG. 1 illustrates one embodiment of a statistical process monitoring system.

Described herein is a method and apparatus for providing a virtual sensor in real-time. In one embodiment, a method to create a virtual sensor in real-time includes identifying data indicating desired functionality for data analysis. The method further includes accessing the virtual sensor in real-time to perform the desired functionality. In one embodiment, the method further includes executing the virtual sensor in real-time based on the identified data to generate an output of the virtual sensor.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.).

The following description provides details of a statistical process monitoring system that monitors processes run on manufacturing devices to detect and/or diagnose faults (manufacturing irregularities). In one embodiment, the statistical process monitoring system is for use in the manufacturing of electronic devices (e.g., semiconductors). Manufacturing such devices generally requires dozens of manufacturing steps involving different types of manufacturing processes. For example, etching, sputtering, and chemical vapor deposition are three different types of processes, each of which is performed on different types of machines. Alternatively, the statistical process monitoring system may be used to monitor the manufacture of other products, such as automobiles. The manufacture of such other products may also require many different processing steps by various manufacturing machines.

FIG. 1 illustrates one embodiment of a statistical process monitoring system. The statistical process monitoring system 100 includes a statistical process monitoring apparatus 1055 coupled with one or more manufacturing machines 110 and one or more process controllers 150 by data communication links 160 and 162. The statistical process monitoring system 100 may include all manufacturing machines 110 in a factory (e.g., a fabrication facility). Alternatively, the statistical process monitoring system 100 may include only some manufacturing machines 110 in the factory, such as all of the manufacturing machines 110 that run one or more specific processes.

In one embodiment, each of the manufacturing machines 110 is a machine for the manufacture of electronic devices, such as etchers, chemical vapor deposition (CVD) furnaces, photolithography devices, implanters, etc. Alternatively, the manufacturing machines 110 may be of a type for manufacturing other products (e.g., automobiles). In one embodiment, each of the manufacturing machines 110 is of a single type. Alternatively, the manufacturing machines 110 may include multiple different types of equipment, each of which may run different processes.

Each of the manufacturing machines 110 may include multiple sensors 112 for monitoring processes run on the manufacturing machines 110. One type of sensor 112 that may be included in the manufacturing machine is a temperature sensor 112. Examples of other sensors 112 include pressure sensors 112, flow rate sensors 112, or any other sensors 112 that monitor physical conditions of a manufacturing process or physical properties of a work piece manufactured by the manufacturing machines 110.

Each manufacturing process that is performed on a manufacturing machine 110 is characterized by various physical conditions and properties measured by the sensors 112, and by various operating parameters, collectively referred to as process data. Each distinct physical condition or property measured by sensors 112, and each operating parameter, may be a distinct process variable of the process data. Examples of process variables representing sensor data include chamber pressure, susceptor temperature, RF forward power, and RF reflected power. Examples of process variables representing operating parameters include flow rate settings (e.g., of chemical reagents), and throttle valve settings (e.g., for a chamber exhaust vacuum pump). The sensors 112, manufacturing machines and process controllers may be monitored during processing to gather the process variables at successive points in time.

In one embodiment, each process variable applies to a specific process. Alternatively, one or more process variables may apply to only portions of a specific process. In one embodiment, sensor measurements and operating parameters for different steps in a process represent distinct process variables (modeled as additional dimensions in model space). This may be useful, for example, if a manufacturing process being performed in a machine has multiple steps with different operating parameter settings. For example, in a three step manufacturing process, a susceptor temperature during the three steps would be treated as three distinct process variables. The division of process steps into separate dimensions in model space may be advantageous, for example, when a single process deposits multiple layers on a workpiece, or when different steps of a process expose the workpiece to different process conditions (e.g., pressure, temperature, etc.).

Process controllers 150 control operating parameters of manufacturing machines 110. For example, process controllers 150 may control chamber temperature, vacuum pumps, gas injection systems, etc. of manufacturing machines 110. Process controllers 150 may store one or more process recipes (recipes) 160. Each recipe 120 may define operating parameters of a manufacturing machine 110 at each step of a process. In one embodiment, recipes 120 may be loaded into manufacturing machines 110 by process controllers 150.

Data communication links 160 may include conventional communication links, and may be wired or wireless. Data may be transmitted between the manufacturing machines 110, the process controllers 150 and the statistical process monitoring apparatus 105 in a raw or processed format. In one embodiment, a semiconductor equipment communications standards (SECS) interface is used. In other embodiments, a generic model for communications and control of manufacturing equipment (GEM) interface, a SECS/GEM interface, a high speed SECS message services (HSMS) interface, etc., may be used.

The statistical process monitoring apparatus 105 may be a single server that analyzes incoming process data from the manufacturing machines 110, sensors 112 and process controllers 150. Alternatively the statistical process monitoring apparatus 105 may include multiple servers and/or computers. The statistical process monitoring apparatus in one embodiment includes a database 180, a statistical process control (SPC) module 184, and a virtual sensor manager 190 which may include at least one virtual sensor 192. In one embodiment, the statistical process monitoring apparatus 105 is included in one or more of the process controllers 150. Alternatively, the process monitoring apparatus 105 may be a distinct separate apparatus.

The database 180 stores raw data and other types of data that may originate from the manufacturing machine(s). In one embodiment, the database 180 is a single storage device of a computer or server of the statistical process monitoring apparatus 105. Alternatively, the database 180 may be external to the statistical process monitoring apparatus 105. In one embodiment, the database 180 includes multiple storage devices, some of which may include redundant copies of data for backup.

Process measurement data (process data) may be stored in the database. The stored process data may be used to show drifts and trends for each of the manufacturing machines 110, for processes run on the manufacturing machines 110, etc. The SPC module 184 performs data processing and analysis functions of data stored in the database 180 and also data generated by one or more visual sensors provided by the visual sensor manager 190. A virtual sensor 192 is a script executed in real-time during data collection to perform arbitrary complex logic functions. Data values calculated by virtual sensors 192 are available for analysis modules (e.g., SPC module) along with tool sensors in real-time (i.e., as soon as data values are calculated).

The database 180 stores raw data received from at least one manufacturing machine 110 and stores analyzed data received from the statistical process control module 184. The virtual sensor manager 190 may be a calculated data tag manager that is communicatively coupled to the database 180 and the statistical process control module 184. Throughout this disclosure, the terms "virtual sensor" and "calculated data tag" (CDT) may be used interchangeably.

Figure 3:
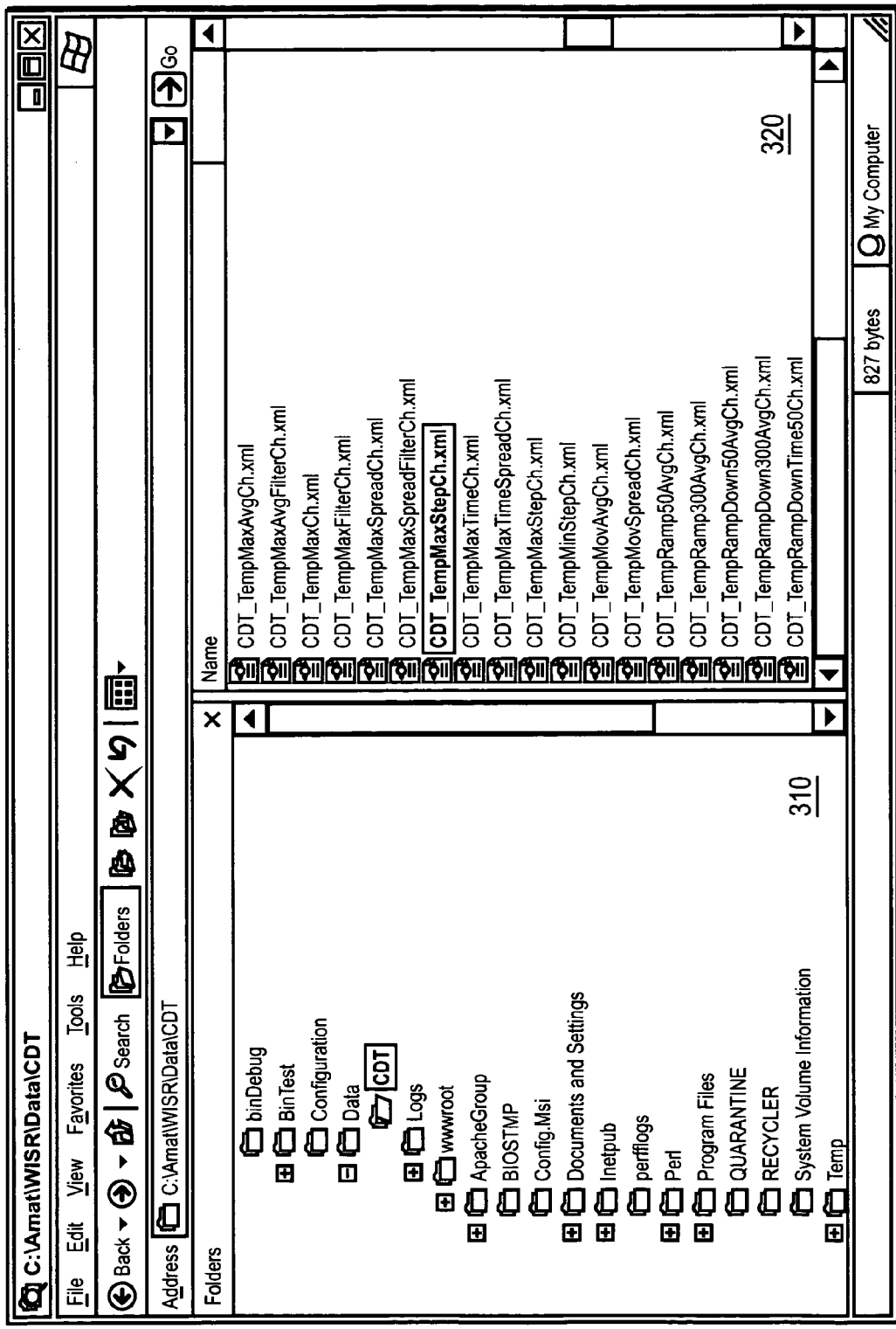
FIG. 3 illustrates an exemplary user interface presenting virtual sensors deployed on a server, in accordance with one embodiment of the invention.

The virtual sensor manager 190 provides at least one virtual sensor or calculated data tag (CDT) for execution during data collection to perform arbitrary complex logic functions. The CDT is a script provided in real-time using a software programming language (e.g., C Sharp (C#), Visual Basic). The CDT may be created as a CDT.xml file. The xml file is then copied into a file directory accessible to a virtual sensor manager as illustrated in FIG. 3. The virtual sensor manager 190 illustrated in FIG. 1 executes the calculated data tag in real-time to perform calculations on selected data and generate an output of the calculated data tag for use by the statistical process control module 184 in real-time. The virtual sensor manager 190 selects data to be used for performing calculations based on an algorithm associated with the calculated data tag being executed in real-time. The virtual sensor manager 190 receives the selected data from at least one of an external physical sensor associated with a machine tool, a second calculated data tag, the database, the machine tool, and a real sensor attached to the machine tool.

The statistical process control module 184 analyzes the output of the calculated data tag in real-time and generates an error notification in real-time based on analyzing the output of the calculated data tag. The statistical process control module 184 can stop a manufacturing machine in real-time in response to analyzing the output of the calculated data tag and determining a fault condition. Creating and executing the calculated data tag in real-time occurs without having to restart a data analysis software application that performs functionality associated with the statistical process control module 184. Real-time actions or events occur immediately or as soon as possible during data collection without having to wait for other operations in contrast to prior approaches that require collecting data, acquiring and storing data, analyzing data, and then acting in a delayed manner.

Virtual sensors or calculated data tags enable the user to perform predefined calculations on raw signals, and use the results to perform SPC analysis. They are particularly powerful because they can be used to create an artificial parameter that is derived from the output of one or more physical sensors. Importantly, they can utilize the element of time to create completely new parameters that a physical sensor simply cannot measure. In one embodiment, virtual sensors perform predefined calculations on raw signals, and use the results to perform SPC analysis and multivariate analysis. For example, virtual sensors can be designated as data collection plans and virtually sense when certain events or conditions occur.

In another embodiment, virtual sensors perform calculations on data received from real sensors. In yet other embodiments, virtual sensors perform calculations on data from real sensors, configuration data (e.g., chamber configuration), process set-points, external physical sensors, and/or other virtual sensors.

In one embodiment, real-time tool (e.g., manufacturing machine) data is collected and stored from the tools into the database. Other information stored in the database 180 may include events and/or alarms associated with the tools. The tool data is stored in a context such as process recipe, wafer data, lot name, etc. The SPC module 184 using collected data and/or real-time data from the visual sensors may generates real time and historical charting including overlying these charts in addition to providing trend charting.

Real-time actions based on discovering a fault or error condition may include stopping a tool or process chamber based on the analysis results and/or notification email to a responsible party. For example, production and research and development engineers can monitor the real-time data and analysis in order to quickly correct a fault or error condition resulting in improved product yield for manufacturing machines.

Figure 2:
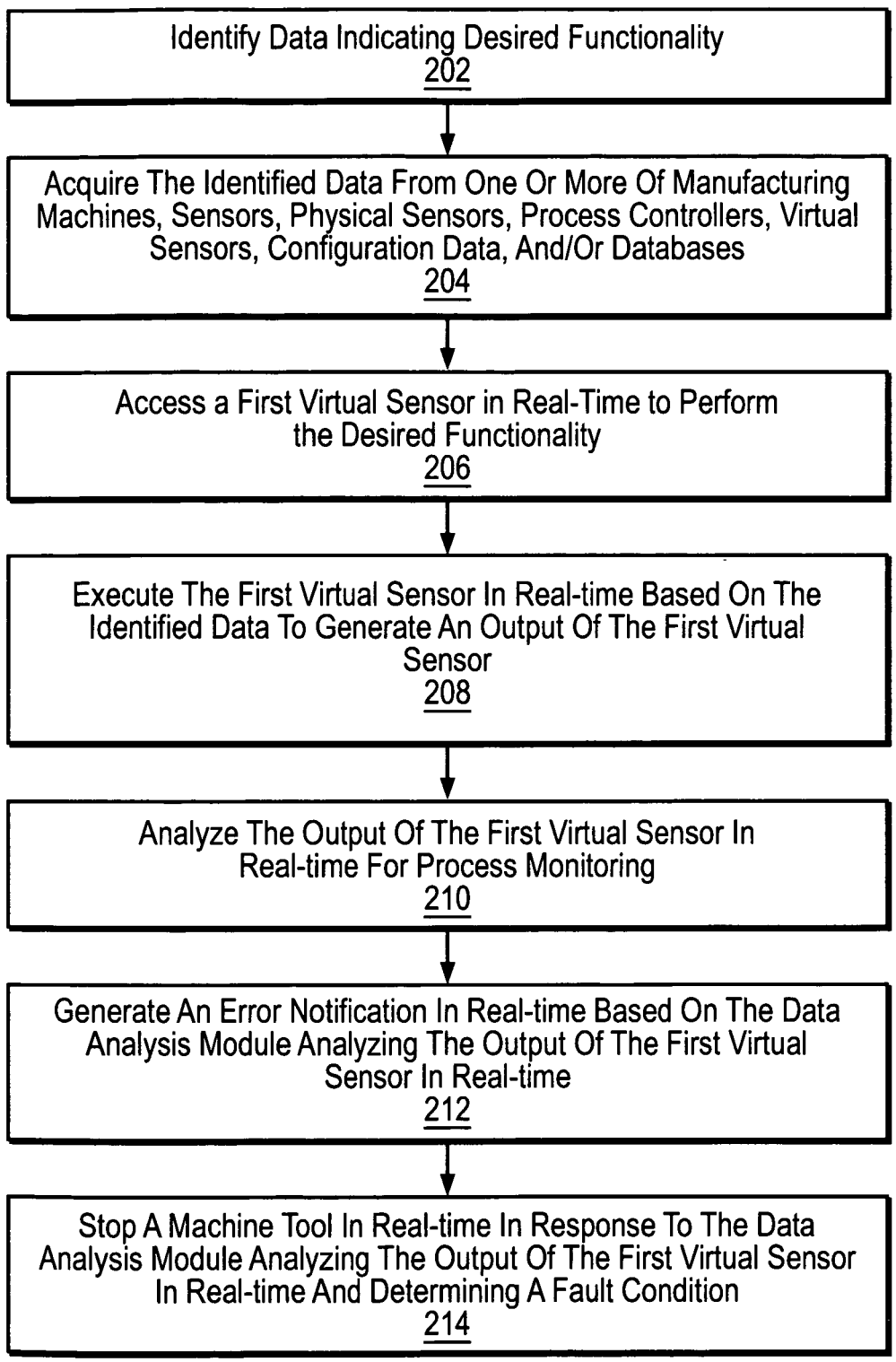
FIG. 2 illustrates a flow diagram of one embodiment for a method of providing a virtual sensor in real-time.

FIG. 2 illustrates a flow diagram of one embodiment for a method 200 of providing real-time virtual sensors. The method may be performed by processing logic that may comprise hardware (e.g., circuitry, dedicated logic, programmable logic, microcode, etc.), software (such as instructions run on a processing device), or a combination thereof. In one embodiment, the method is performed by the statistical process monitoring apparatus 105 of FIG. 1.

Referring to FIG. 2, the method begins with identifying data indicating desired functionality (e.g., fault detection, error detection, process monitoring) at block 202. The method further includes acquiring the identified data from one or more of manufacturing machines, sensors, physical sensors, process controllers, virtual sensors, configuration data, and/or databases at block 204. The identified data may include, for example, chamber temperature, pressure, gas flow rates, etc. The identified data used by a first virtual sensor can be formed from a combination of data sources including at least one of the following: a database, a machine tool, a real sensor attached to the machine tool, a external physical sensor associated with the machine tool, a second virtual sensor, and a third virtual sensor. The identified data may be indicative of a fault if, for example, the temperature is too high or too low, the gas flow rates are erratic, the pressure is different than is required for a current process, etc.

The method further includes accessing the first virtual sensor in real-time to perform the desired functionality at block 206. The first virtual sensor (e.g., in response to user input) may be coded using a software programming language (e.g., C Sharp (C#), Visual Basic) and stored in a xml file. The xml file is then copied into a file directory located on a server such as the virtual sensor manager as illustrated in FIG. 3. The method further includes executing the first virtual sensor in real-time based on the identified data to generate an output of the first virtual sensor at block 208. The method further includes analyzing the output of the first virtual sensor in real-time at block 210 with the data analysis module for statistical process monitoring. The statistical process monitoring may include detecting fault conditions, error conditions, and/or monitoring various parameters and/or derived parameters (e.g., temperature set-point, temperature reading, minimum/maximum/standard deviation during recipe steps, moving average of pressure reading during a recipe step, average value of a plurality of temperature sensors during a recipe step, and width of temperature peak for predetermined temperature deviation from maximum temperature during a recipe). Creating, accessing, and executing the first virtual sensor in real-time occurs without having to restart or reinstall a data analysis software application that performs functionality associated with the data analysis module.

The method further includes generating an error notification in real-time based on the data analysis module analyzing the output of the first virtual sensor in real-time at block 212. The method further includes stopping a machine tool in real-time in response to the data analysis module analyzing the output of the first virtual sensor in real-time and determining a fault condition at block 214.

In one embodiment, a tool records temperature set-points and temperature readings on a continuous basis during process conditions. This data is transferred to the database via a communication link. A dynamically created virtual sensor generates temperature error data in real-time based on the temperature set-point and temperature reading data. The temperature error data is sent to a data analysis module in real-time for analysis and corrective action is taken if necessary.

Other examples for a virtual sensor or CDT include the following: minimum, maximum, standard deviation during recipe steps range; moving average of pressure reading during specific recipe step for specific process recipe; average value of a plurality of temperature sensors during the recipe step; and width of temperature peak for a certain temperature degree deviation from maximum during a recipe (e.g., 50 degree).

Prior approaches would have required creating a new built in algorithm, documenting the new algorithm, releasing a new software version or update with the new algorithm, restarting or rebooting each tool that requires the new algorithm, evaluating the algorithm under test conditions, and then performing analysis with the new algorithm. These prior approaches are not able to plug in a new algorithm on a real-time basis during data collection and quickly respond to the data analysis.

A virtual sensor has numerous advantages compared to prior approaches. For example, some tool sensors are not exposed or easily accessible. A virtual sensor may calculate a result based on data from existing tool sensors. If the required sensor is not exposed then a virtual sensor can be used to communicate with an external sensor. As will be discussed in more detail below, virtual sensors can be easily added or modified by users. Rather than just applying an algorithm to raw data that the tool provides, the virtual sensors also allow the collecting and processing of additional data by attaching external sensors that are not normally part of the tool. This can be done to troubleshoot issues, i.e. attach an extra temperature sensor to the process chamber. Virtual sensors can then read in the data from those external sensors and process them. Since this data from external sensors can also be combined with raw tool data in the algorithms, this is a powerful mechanism to analyze process behavior. A virtual sensor can also transform a tool sensor value that may originate from tools having different protocols into a value used for data analysis.

A virtual sensor can be developed in the format of an extensible markup language (XML) file containing a programming language script such as C Sharp (#) or visual basic. A virtual sensor can be deployed by copying the XML file into a file directory of the virtual sensor manager as illustrated in FIG. 3 with no software restart or experimentation needed. A virtual sensor can execute arbitrary complex script logic based on a particular processing requirement for a particular tool. Also, a virtual sensor can be accessed easily by other modules including other virtual sensors. Furthermore, data from both tool sensors and virtual sensors can be equally available for real-time and historical data analysis.

FIG. 3 illustrates an exemplary user interface presenting virtual sensors deployed on a server, in accordance with one embodiment of the invention. Each XML file on the right hand side 320 of the screen 300 represents a different virtual sensor provided by a virtual sensor manager. In one embodiment, a virtual sensor is a calculated data tag (CDT) that is calculated using data collected from the tool or other CDT's data. For example, the CDT named "Average Pressure During Recipe Step" calculates an average of data tag ("Pressure"). Average is calculated on interval defined by changing value of another data tag ("Recipe Step"). Each time a recipe step value is changed, the CDT calculates the average of Pressure for the time interval between a current and a previous change of the Recipe Step value.

Referring back to FIG. 1, the VSM 190 may represent a calculated data tag manager (CDTM) having a set of classes which perform all operations required to produce data by using calculated data tags for managing a list of templates to actual instantiation of a CDT instance and interaction between CDT and another application (e.g., foundation manager).

Figure 4:
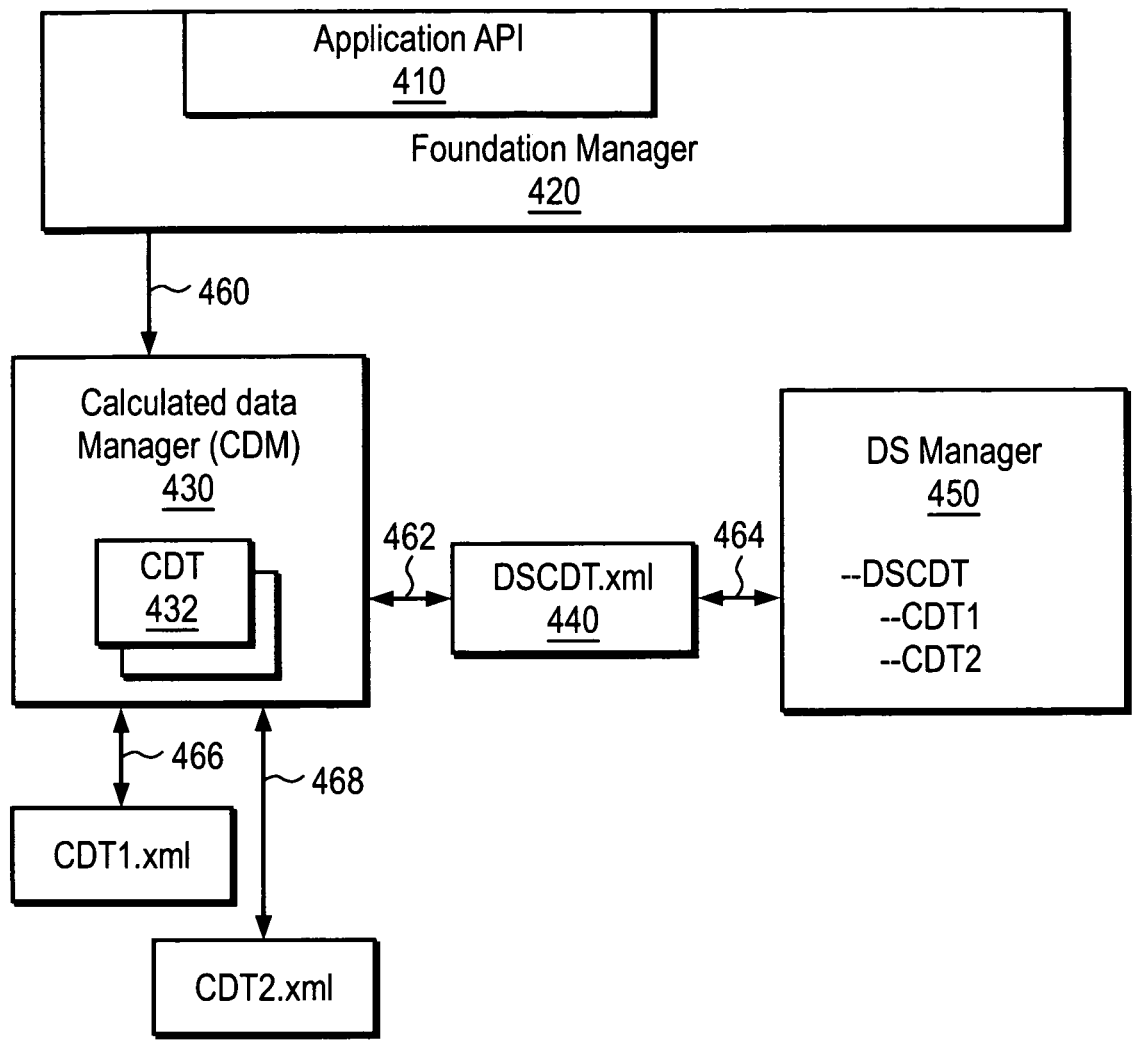
FIG. 4 illustrates a software model for CDT design.

FIG. 4 illustrates a software model for a CDT design in accordance with one embodiment of the invention. An application programming interface (API) 410 interfaces with a foundation manager 420. The foundation manager 420 communicates with a calculated data manager (CDM) 430 via a link 460. In one embodiment, the CDM 430 includes functionality similar to the CDTM discussed above. In another embodiment, the CDM 430 includes functionality similar to the VSM 190 discussed in conjunction with FIG. 1.

A user configures calculated data tags (e.g., CDT 432) using a graphical user interface (GUI). The CDM 430 generates a special data source (DSCDT) xml file directory 440 with configuration xml file(s) such as CDT1.xml and CDT2.xml for the calculated data tags. Each CDT may be associated with one data source xml file. In one embodiment, the file directory 440 includes a list of CDTs such as CDT_chamberA and CDT_chamberB as discussed above in conjunction with FIG. 3. The data source manager 450 can be communicatively coupled to various data sources such as a database and/or machine tools. The data source manager 450 reads CDTs from the file directory 440 and creates appropriate attributes for the CDTs. Various bi-directional links 460, 462, 464, 466, and 468 allow the different managers to communicate. These links can communicate data, subscription information, and/or notification information.

In one embodiment, a CDT (calculated data tag) for a SPC application has the following XML file format.

<Type>—type of data tag.
<Language>—for example, a language available is C# or visual basic
<Aliases>—contains the list of data tags used in CDT calculation
<Alias>—particular tag used in CDT calculation
Name—the name of alias which is used in Get* methods to reference the data tag
FullName—the full name of the data tag which corresponds to alias
VIDName—VID of the data tag which corresponds to alias
<Variables>—contains list of state variables required during CDT calculation
<Variable>—describes variable definition
Name—name of variable to use in code
Type—datatype of the variable
Initial—initial value of variable when CDT instance created
<Code>—definition of methods
<OnDataChange>—the code which is executed each time any of alias value is changed Example of CDT definition:

```
<?xml version='1.0'?>
<CDT>
  <Type>E</Type>
  <Language>C#</Language>
  <Aliases>
    <Alias Name="TemperatureChB" VIDName="SVID_102241"/>
  </Aliases>
  <Variables>
    <Var Name="m_Min" Type="double" Initial="0"/>
    <Var Name="m_Active" Type="bool" Initial="false"/>
  </Variables>
  <Code>
    <OnDataChange>
      <![CDATA[
        m_Min = 1;
        m_Active = false;
        SetValue( GetTimestamp("TemperatureChB"),
(double)GetValue("TemperatureChB") + 1000);
      ]]>
    </OnDataChange>
  </Code>
</CDT>
```

A single XML definition may be used for multiple CDT instances. To make an XML definition reusable with different instances there are multiple methods available in the CDT framework.

For example, using ShortName in alias—if you declare alias which uses ShortName, then CDT manager use the following logic to find a data tag which corresponds to alias:
  Name of data tag is the value specified in ShortName attribute
  Index, Location, Slot, Side is taken from CDT configuration in DSCDT.xml file.

For example, there is CDT tag which has the following alias

```
<Alias
  Name="TagValue" ShortName="Temperature_Main_Channel"/>
```
then if this CDT declared in DSCDT.xml the following way:
```
<Tags>
  <Name>Average Temperature During Recipe Step</Name>
  <VID>AverageTemperatureDuringStep:B</VID>
  <Type>Double</Type>
  <Unit>None</Unit>
  <Location>B</Location>
  <Index>5</Index>
  <Kind>CDT</Kind>
</Tags>
```

CDT manager will resolve the alias to data tag with name "Temperature_Main_Channel", location "B" and index 5.

Figure 5:
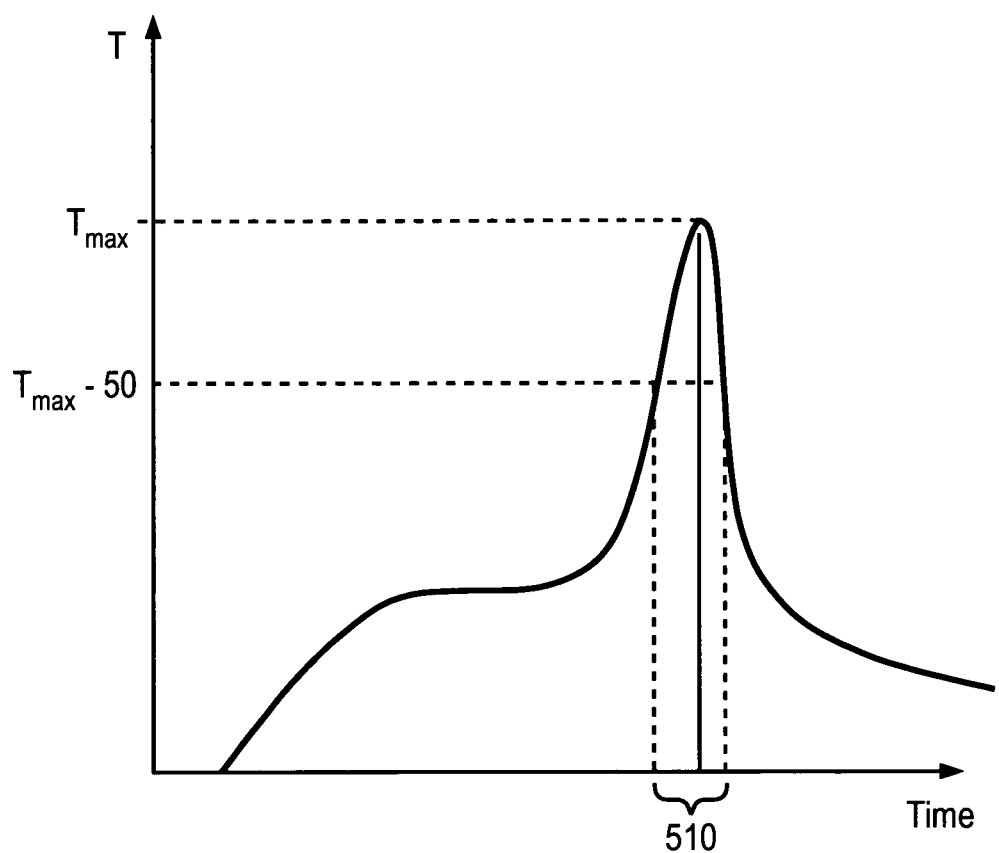
FIG. 5 illustrates a temperature versus time chart with a virtual sensor representing a temperature spike width.
Figure 6:
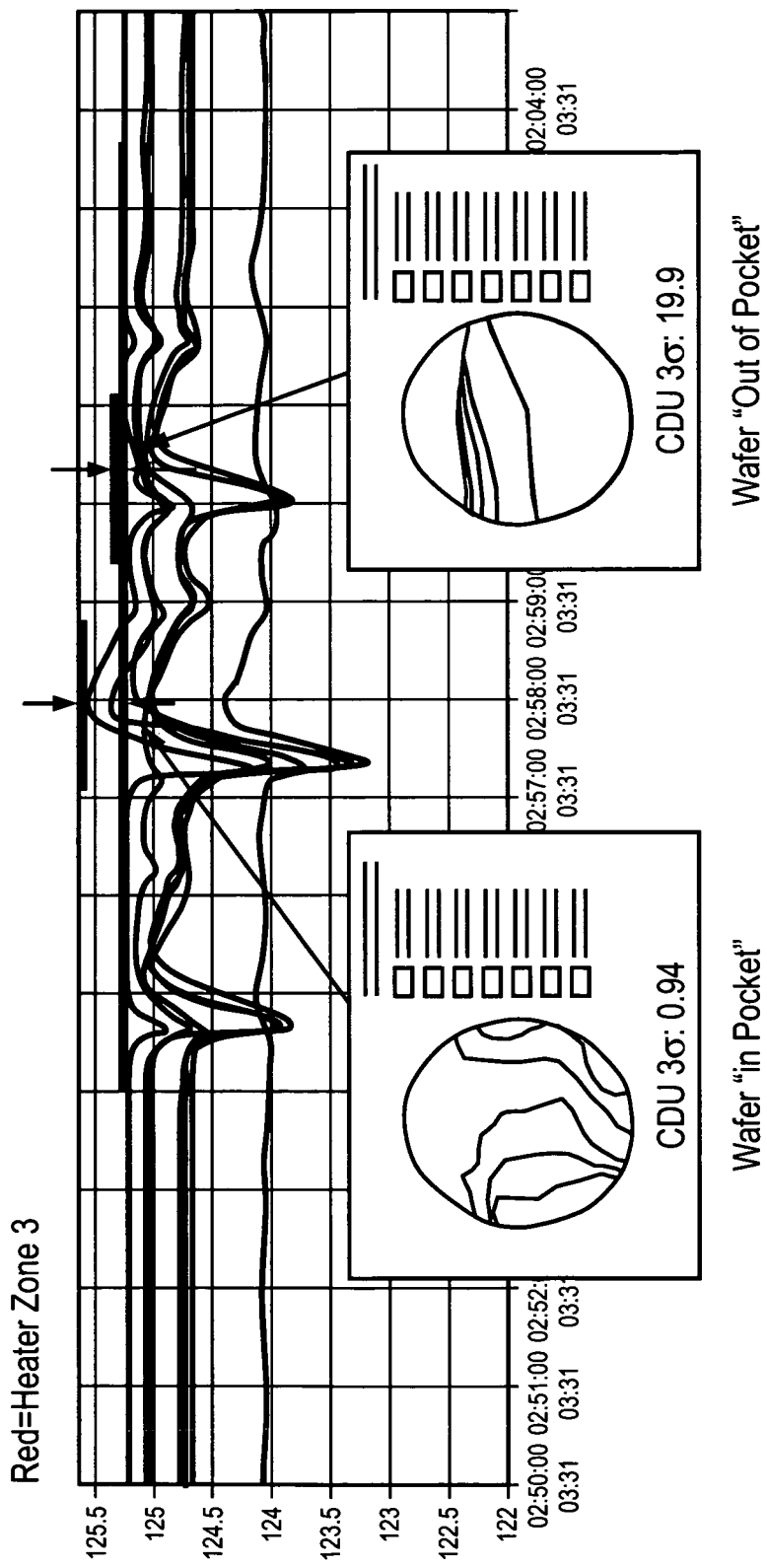
FIG. 6 illustrates a virtual sensor that detects a wafer placement issue in a tool heater zone.
Figure 7:
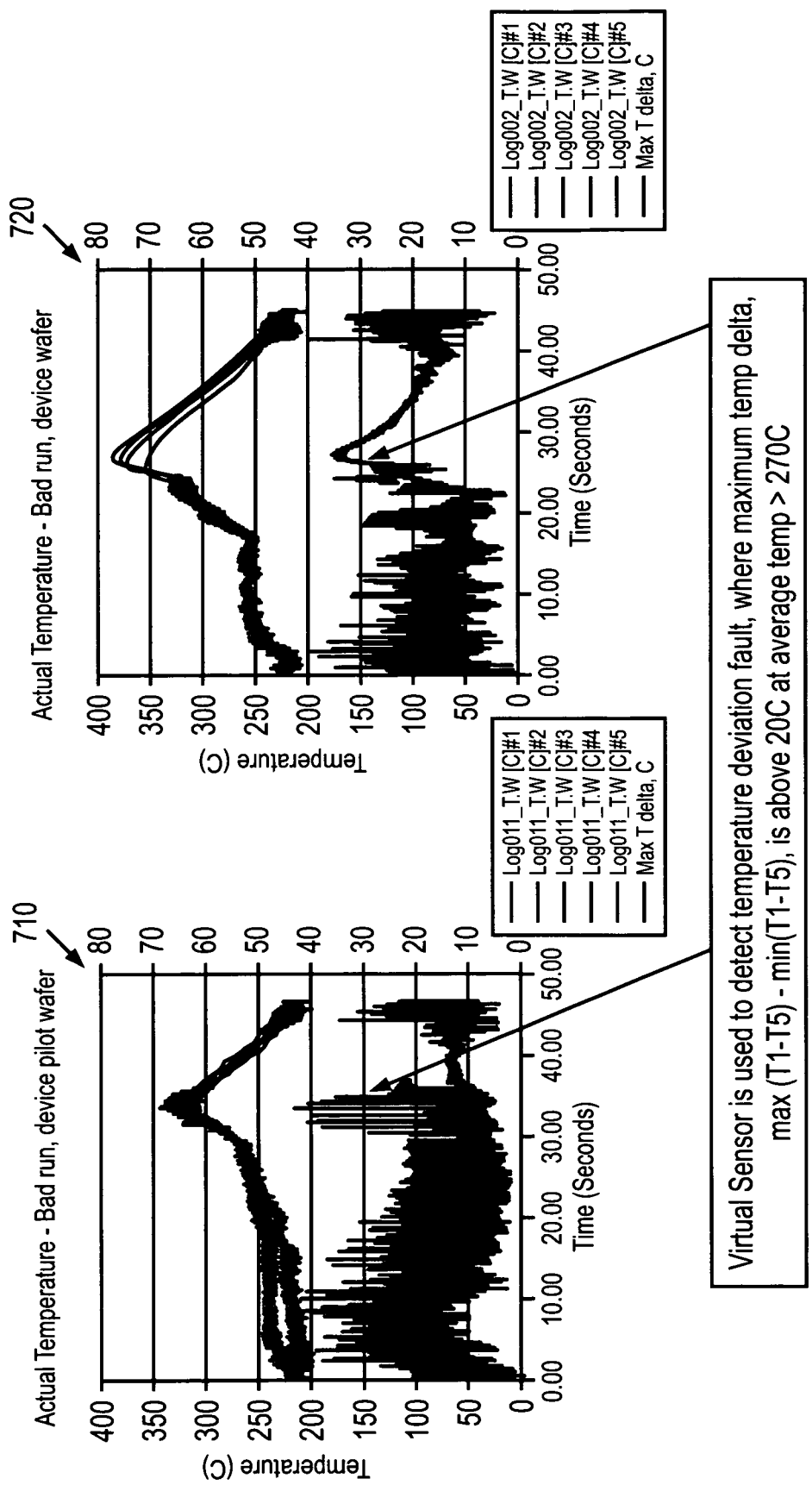
FIG. 7 illustrates a virtual sensor that detects a temperature deviation fault.

FIGS. 5-7 represent virtual sensor applications. A virtual sensor value is collected in real-time during manufacturing processing and used in SPC charts. An email notification may be sent to a responsible party if a threshold configured by a SPC module is violated. For example, FIG. 5 illustrates a temperature, T, versus time chart with a virtual sensor (VS) representing a temperature spike width 510. In this embodiment, the temperature spike width 510 is the time required to increase the process temperature from a maximum temperature minus 50 degrees to a maximum temperature and then decrease the temperature back to the maximum temperature minus 50 degrees.

FIG. 6 illustrates a virtual sensor that detects a wafer placement issue in a tool heater zone. A wafer properly positioned "in pocket" has a 3 sigma critical dimension unit (CDU) of 0.94. By contrast, a wafer that is not properly positioned "out of pocket" has a 3 sigma critical dimension unit (CDU) of 19.9. The "out of pocket" wafer has a wedge pattern suggesting the wafer was sitting on wafer pocket pins. The virtual sensor can be designed with the formula: $Tmax\text{-}error = Tact\_max - Tset\text{-}point$ in order to detect an improperly positioned wafer or other type of error or fault condition.

FIG. 7 illustrates a virtual sensor that detects a temperature deviation fault. The two charts, 710 and 720, each illustrate actual temperature and maximum delta in temperature versus time for various process runs. In one embodiment, the virtual sensor is designed to detect when the maximum temperature delta exceeds 20 degrees Celsius (C) for an average temperature greater than 270 degrees C. The arrows point towards bad runs on charts 710 and 720.

As illustrated in FIGS. 5-7 virtual sensors have numerous applications. Additionally, virtual sensors are applicable for research and development groups that require complex logic for data analysis. Virtual sensors can be easily developed with new analysis algorithms that can be deployed in real-time ("on-the-fly") during data collection. Data can be collected and analyzed even though the software application does not provide the needed data itself. Virtual sensors enable the receiving of results in real-time in order to adjust algorithms accordingly in real-time.

Virtual sensors are also applicable for process and diagnostic groups that benefit from receiving real-time notifications based on virtual sensor values. Data analysis modules (e.g., SPC, APC, chamber matching) are supported by virtual sensors. These groups also benefit from using derivate metrics based on virtual sensors for hardware matching and qualification.

Virtual sensors enable users of manufacturing machines to collect and analyze data in real-time for research and development, process monitoring and diagnostics, and hardware matching. A virtual sensor mechanism implemented in a SPC software application decreases the cost of implementation and deployment of different data analysis applications such as SPC, APC, and hardware matching. Virtual sensors allow users to implement their own algorithms protected with intellectual property while also leveraging the SPC application capabilities for advanced process control and monitoring and data analysis applications.

Figure 8:
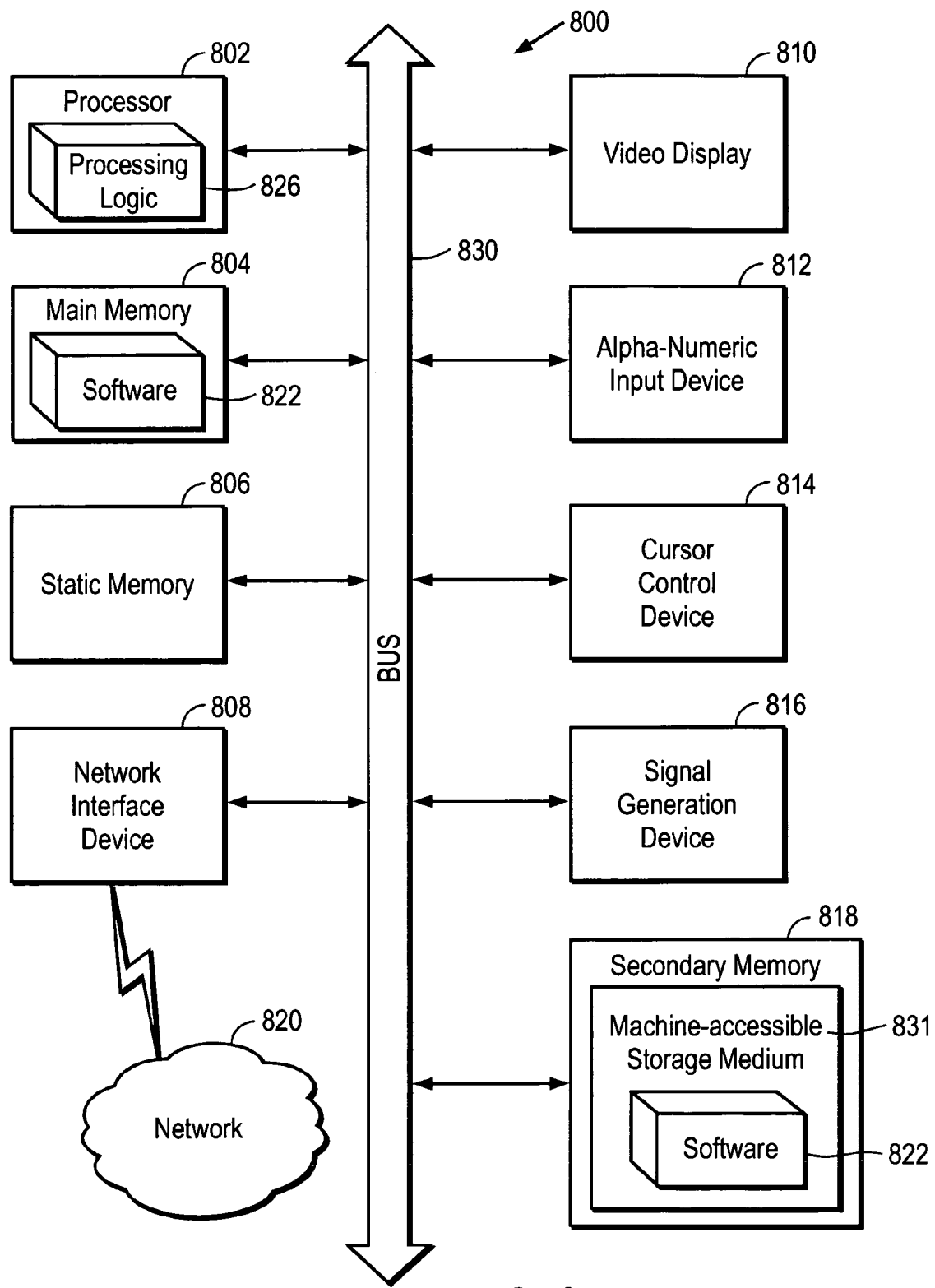
FIG. 8 illustrates a diagrammatic representation of a machine in the exemplary form of a computer system within which a set of instructions, for causing the machine to perform any one or more of the methodologies discussed herein, may be executed.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 914 (e.g., a mouse), and a signal generation device 816 (e.g., a speaker).

The data storage device 818 may include a machine-accessible storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-accessible storage media. The software 822 may further be transmitted or received over a network 820 via the network interface device 808.

The machine-accessible storage medium 831 may also be used to store data structure sets that define user identifying states and user preferences that define user profiles. Data structure sets and user profiles may also be stored in other sections of computer system 800, such as static memory 806.

While the machine-accessible storage medium 831 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method to provide a virtual sensor in real-time, comprising:
   identifying data indicating desired functionality;
   creating a first virtual sensor in real-time during data collection by determining an algorithm to perform calculations including logic functions on the identified data to obtain the desired functionality, wherein creating the first virtual sensor further includes storing the algorithm, which is a programming language script, in a format of an extensible markup language (xml) file and copying the xml file into a file directory of a virtual sensor manager;
   executing the first virtual sensor in real-time during data collection based on the identified data to generate an output of the first virtual sensor with the output including an artificial parameter that is being used by at least one data analysis module in real-time for statistical process monitoring of at least one machine tool in a manufacturing facility; and
   creating, in real-time, a data collection plan for the first virtual sensor based on an analysis performed by the at least one data analysis module.

2. The method of claim 1, further comprising:
   acquiring, with the first virtual sensor, the identified data from a physical sensor and a second virtual sensor that includes another algorithm to perform calculations on selected data.

3. The method of claim 1, further comprising:
   acquiring the identified data from at least one of a database, the at least one machine tool, and a real sensor attached to the machine tool, wherein the artificial parameter can not be measured by a physical sensor.

4. The method of claim 1, wherein the identified data used by the first virtual sensor is formed from a combination of data sources comprising at least two of the following: a database, a machine tool of the at least one machine tool, a real sensor attached to the machine tool, an external physical sensor associated with the machine tool, a second virtual sensor, and a third virtual sensor.

5. The method of claim 1, further comprising:
analyzing the output of the first virtual sensor in real-time; and
generating an error notification in real-time based on the data analysis module analyzing the output of the first virtual sensor in real-time.

6. The method of claim 5, further comprising:
stopping a machine tool in real-time in response to the data analysis module analyzing the output of the first virtual sensor in real-time and determining a fault condition.

7. The method of claim 1, wherein accessing and executing the first virtual sensor in real-time occurs without having to restart a data analysis software application that performs functionality associated with the data analysis module.

8. A non-transitory machine-accessible medium including data that, when accessed by a machine, cause the machine to perform a method comprising:
identifying data indicating desired functionality;
creating a first virtual sensor in real-time during data collection by determining an algorithm to perform calculations including logic functions on the identified data to obtain the desired functionality, wherein creating the first virtual sensor further includes storing the algorithm, which is a programming language script, in a format of an extensible markup language (xml) file and copying the xml file into a file directory of a virtual sensor manager;
executing the first virtual sensor in real-time during data collection based on the identified data to generate an output of the first virtual sensor with the output including an artificial parameter that is being used by at least one data analysis module in real-time for statistical process monitoring of at least one machine tool in a manufacturing facility; and
creating, in real-time, a data collection plan for the first virtual sensor based on an analysis performed by the at least one data analysis module.

9. The machine-accessible medium of claim 8, the method further comprising:
acquiring, with the first virtual sensor, identified data from a physical sensor and a second virtual sensor that includes another algorithm to perform calculations on selected data.

10. The machine-accessible medium of claim 8, the method further comprising:
acquiring the identified data from at least one of a database, the at least one machine tool, and a real sensor attached to the machine tool, wherein the artificial parameter can not be measured by a physical sensor.

11. The machine-accessible medium of claim 8, wherein the identified data used by the first virtual sensor is formed from a combination of data sources comprising at least two of the following: a database, a machine tool of the at least one machine tool, a real sensor attached to the machine tool, an external physical sensor associated with the machine tool, a second virtual sensor, and a third virtual sensor.

12. The machine-accessible medium of claim 8, the method further comprising:
analyzing the output of the first virtual sensor in real-time; and
generating an error notification in real-time based on the data analysis module analyzing the output of the first virtual sensor in real-time.

13. The machine-accessible medium of claim 12, the method further comprising:
stopping a machine tool in real-time in response to the data analysis module analyzing the output of the first virtual sensor in real-time and determining a fault condition.

14. The machine-accessible medium of claim 8, wherein accessing and executing the first virtual sensor in real-time occurs without having to restart a data analysis software application that performs functionality associated with the data analysis module.

15. A process monitoring apparatus, comprising:
a processor coupled to a memory;
a database to store raw data received from at least one manufacturing machine of a manufacturing facility and to store analyzed data; and
a calculated data tag manager communicatively coupled to the database, the calculated data tag manager having at least one calculated data tag that is created in real-time during data collection, wherein the calculated data tag manager executes the at least one calculated data tag in real-time during data collection by performing the calculations on the selected data to generate an output of the at least one calculated data tag with the output including an artificial parameter that is being used by a statistical process control module in real-time for statistical process monitoring, wherein the calculated data tag manager selects data to be used for performing calculations based on an algorithm associated with the at least one calculated data tag being executed in real-time, and wherein the calculated data tag manager creates, in real-time, a data collection plan based on an analysis performed by the statistical process control module, wherein creating the at least one calculated data tag further includes storing the algorithm, which is a programming language script, in a format of an extensible markup language (xml) file and copying the xml file into a file directory of the calculated data tag manager.

16. The process monitoring apparatus of claim 15, wherein the calculated data tag manager receives the selected data from at least one of an external physical sensor associated with a machine tool, a second calculated data tag, the database, the machine tool, and a real sensor attached to the machine tool.

17. The process monitoring apparatus of claim 15, wherein the calculated data tag manager further comprises a set of classes that perform operations necessary for generating data using one or more calculated data tags.

18. The process monitoring apparatus of claim 15, wherein the statistical process control module to analyze the output of the at least one calculated data tag in real-time and to generate an error notification in real-time based on analyzing the output of the at least one calculated data tag in real-time.

19. The process monitoring apparatus of claim 18, wherein the statistical process control module to stop a manufacturing machine in real-time in response to analyzing the output of the at least one calculated data tag in real-time and determining a fault condition.

20. The process monitoring apparatus of claim 19, wherein creating and executing the at least one calculated data tag in real-time occurs without having to restart or reinstall a data analysis software application that performs functionality associated with the statistical process control module.

21. The process monitoring apparatus of claim 15, further comprising a statistical process control module to analyze data and to send the analyzed data to the database.

22. The method of claim 1, further comprising:
acquiring the identified data from a data source associated with the manufacturing facility, the manufacturing facility comprising a machine tool.

* * * * *